US012812027B2

(12) United States Patent
Hart

(10) Patent No.: US 12,812,027 B2
(45) Date of Patent: Nov. 24, 2026

(54) NEGOTIATING NUANCED PREAMBLE EXTENSION

(71) Applicant: Cisco Technology, Inc., San Jose, CA (US)

(72) Inventor: Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 271 days.

(21) Appl. No.: 18/774,516

(22) Filed: Jul. 16, 2024

(65) Prior Publication Data

US 2025/0030787 A1 Jan. 23, 2025

Related U.S. Application Data

(60) Provisional application No. 63/514,997, filed on Jul. 21, 2023.

(51) Int. Cl.
*H04L 69/24* (2022.01)
*H04W 28/22* (2009.01)
*H04W 84/12* (2009.01)

(52) U.S. Cl.
CPC ............. *H04L 69/24* (2013.01); *H04W 28/22* (2013.01); *H04W 84/12* (2013.01)

(58) Field of Classification Search
CPC ........ H04L 69/24; H04W 28/22; H04W 84/12
See application file for complete search history.

(56) References Cited

U.S. PATENT DOCUMENTS 11,800,894 B2 * 10/2023 Fernando .................. A24F 1/30
2017/0006608 A1 1/2017 Josiam et al.
2020/0287759 A1 * 9/2020 Van Nee ............. H04L 27/2613
2021/0051722 A1 2/2021 Huang et al.
(Continued)

FOREIGN PATENT DOCUMENTS

EP 3267642 A1 1/2018
WO 2023191571 A1 10/2023

OTHER PUBLICATIONS

Hart B (Cisco Systems)., et al., "Low Power and Long Range Preamble", IEEE Draft, 11-23-1100-00-0UHR-Low-Power-and-Long-Rang E-Preamble, IEEE-SA Mentor, Piscataway, NJ, USA, vol. 802.11 UHR, Jul. 10, 2023, pp. 1-6, XP068204092, Retrieved from https://mentor.ieee.org/802.11/dcn/23/11-23-1100-00-0uhr-low-power-and-long-range-preamble.pptx on Jul. 10, 2023, The Whole Document, p. 2, p. 4.

(Continued)

*Primary Examiner* — Hashim S Bhatti
(74) *Attorney, Agent, or Firm* — Patterson + Sheridan, LLP

(57) ABSTRACT

A method and system for negotiating a duration of an extension portion of a preamble are disclosed. In a PPDU, a preamble extension has several forms. A station and an access point (AP) negotiate to select one or more of the forms suited to a change in the operation of the station. When the change is increased data throughput, the station sends one or more throughput-related parameters in a proposal to the AP. When the change is the number of spatial streams, the station sends the number as a parameter in the proposal. When the change is a different coding set, then the coding set is sent as the parameter in the proposal. The AP responds to the proposal which fixes the values of the parameters and the duration of the extension portion of the preamble.

20 Claims, 9 Drawing Sheets

(56) References Cited

U.S. PATENT DOCUMENTS

| | | | | |
|---|---|---|---|---|
| 2021/0400727 | A1* | 12/2021 | Lu | H04L 1/0068 |
| 2022/0345343 | A1 | 10/2022 | Lim et al. | |
| 2024/0040505 | A1 | 2/2024 | Park | |
| 2026/0020002 | A1* | 1/2026 | Lim | H04L 5/0044 |
| 2026/0122508 | A1* | 4/2026 | Vermani | H04B 7/024 |

OTHER PUBLICATIONS

International Search Report and Written Opinion for International Application No. PCT/US2024/038825, mailed Oct. 31, 2024, 14 Pages.

Arista: "Wi-Fi 7: A Leap Towards Time-Sensitive Networking", White Paper, Oct. 7, 2023, Retrieved from https://www.arista.com/assets/data/pdf/Whitepapers/Arista-Wi-Fi-7-White-Paper.pdf, 14 Pages.

Electronics Notes: "Understanding IEEE 802.11be Wi-Fi 7", Retrieved from https://www.electronics-notes.com/articles/connectivity/wifi-IEEE-802-11/802-11be-wifi7.php on Nov. 8, 2022, pp. 1-9.

Hill S., "What is Wi-Fi 7? Everything You Need to Know", WIRED.com, May 24, 2022, Retrieved from https://www.wired.com/story/what-is-wi-fi-7/, pp. 1-12.

IEEE: "IEEE P802.11be™M/D5.0 Draft Standard for Information technology—Tele-Communications and Information Exchange Between Systems Local and Metropolitan Area Networks—Specific Requirements, Part 11: Wireless LAN Medium Access Control (MAC) and Physical Layer (PHY) Specifications, Amendment 8: Enhancements for Extremely High Throughput (EHT)", IEEE P802.11be™ /D5.0, Nov. 2023, 1045 Pages.

* cited by examiner

NEGOTIATING NUANCED PREAMBLE EXTENSION

CROSS-REFERENCE TO RELATED APPLICATIONS

This application claims the benefit of co-pending U.S. provisional patent application Ser. No. 63/514,997 filed Jul. 21, 2023. The aforementioned related patent application is herein incorporated by reference in its entirety.

TECHNICAL FIELD

Embodiments presented in this disclosure generally relate to a physical protocol data unit (PPDU). More specifically, embodiments disclosed herein related to the duration of extension portions of preambles in the PPDUs.

BACKGROUND

In the 802.11be amendment (Wi-Fi 7), vendors selling station stations have built into the stations multiple receiver capability modes (or distinct receivers with different capabilities), including a low power, low capability receiver operation, for example, supporting a single spatial stream (SS), up to (and including) 16-quadrature amplitude modulation (QAM) with a ½ or ¾ coding rate and a 20 or 40 MHZ bandwidth (BW). However, stations also have a more capable receiver operation, such as a receiver capable of up to (and including) 2 SSs, up to (and including) 4K QAM ⅚, and up to (and including) 320 MHz. A station operating with low capability can await receipt of a short frame, such as a multi-user request-to-send (MU RTS) frame, and then send a clear-to-send (CTS) response frame and, in parallel with the CTS frame, trigger the station to change to (or wake up) its higher capability operation to handle a PPDU transmitted at a higher data rate. Using a MU RTS/CTS protocol to cause a station to alter or transition its operation is time-consuming and degrades the efficiency of medium access, especially if PPDUs often contain a short payload (i.e., data field) and a short payload can be more common as the PHY data rates increase.

Changing the number of spatial streams (NSS) in a station with a higher capability can take less than 100 microseconds, but changing the BW may take hundreds of microseconds or even several milliseconds, while transmission of the PPDU may take only one or two milliseconds.

One way to improve a station's performance is to control the duration of an extension portion of a preamble in the PPDU. However, preambles in the PPDU have historically had a fixed duration. There is a need for more flexibility in the PPDU to adjust the duration of the preamble to suit a station operating with a higher capability (e.g., higher PPDU transmission rates).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
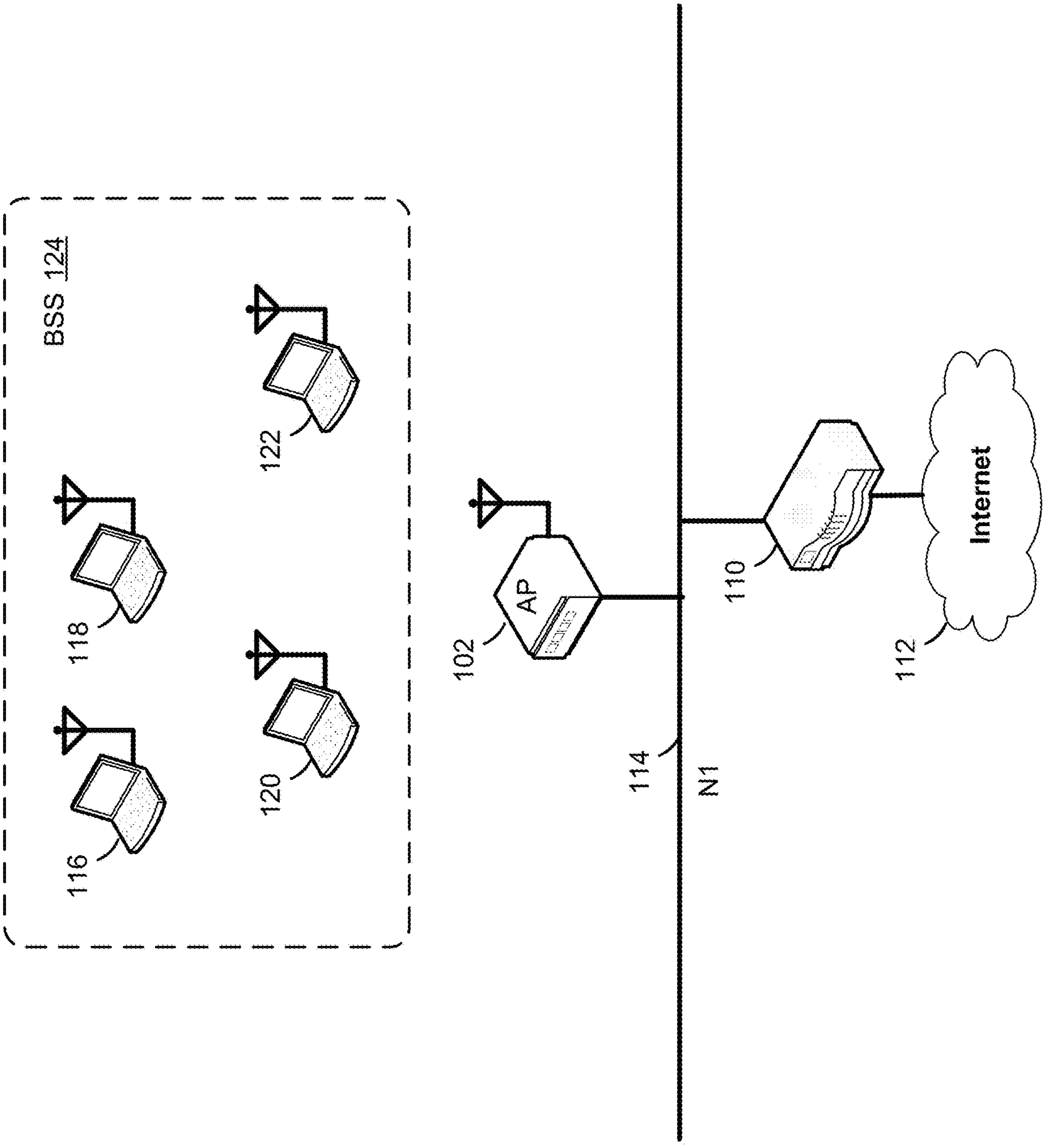
FIG. 1 depicts a representative wireless infrastructure and the multiple stations thereby supported, according to embodiments.

One embodiment presented in this disclosure is a method of negotiating a duration of an extension portion of a preamble. The method includes receiving a proposal from a station, which includes a set of parameters with first values to be used by the station when the station makes an operational transition, and responding to the proposal. Responding to the proposal fixes the values of the set of parameters and the duration of the extension portion of the preamble and includes either accepting the proposal, sending a counter-proposal with the set of parameters having second values, or receiving a new proposal from the station with the set of parameters having third values. The parameters specify the modulation and coding scheme, the number of spatial streams, and the change in data throughput for the station's operation, and the duration of an extension portion of the preamble.

Another embodiment presented in this disclosure is an AP which includes a processor and a memory coupled to the processor and loaded with a program executable by the processor to receive a proposal from a station, where the proposal includes a set of parameters with first values to be used by the station when the station makes an operational transition and responding to the proposal. Responding to the proposal fixes the values of the set of parameters and a duration of an extension portion of a preamble and includes either accepting the proposal, sending a counter-proposal with the set of parameters having second values, or receiving a new proposal from the station with the set of parameters having third values. The parameters specify the modulation and coding scheme, the number of spatial streams, and the change in data throughput for the station's operation, and the duration of the extension portion of the preamble.

Yet another embodiment presented in this disclosure is a non-transitory computer-readable medium encoding instructions, which, when executed by a processor of an AP coupled to a wireless medium, cause the AP to receive a proposal from a station, where the proposal includes a set of parameters with first values to be used by the station when the station makes an operational transition and causing the AP to respond to the proposal. Responding to the proposal fixes the values of the set of parameters and a duration of an extension portion of a preamble and includes either accepting the proposal, sending a counter-proposal with the set of parameters having second values, or receiving a new proposal from the station with the set of parameters having third values. The parameters specify the modulation and coding scheme, the number of spatial streams, and the change in data throughput for the station's operation, and the duration of the extension portion of the preamble.

EXAMPLE EMBODIMENTS

Wi-Fi 7 makes several improvements over the 802.11ax amendment (Wi-Fi 6). Those improvements include higher peak data rates (from 9.6 gigabits per second (Gbps) to 36 Gbps), wider BW channels (from 160 MHz to 320 MHz), higher modulation constellations (from 1024 to 4096 QAM), and multiple resource units (RUs) (MRUs) per station, each of which contributes to higher data throughput. The 802.11bn amendment ((Wi-Fi 8), aka ultra-high reliability (UHR)) will make further improvements to Wi-Fi 7.

Many Wi-Fi 7 stations (e.g., smartphones and laptop computers) have a low-capability mode that consumes low power. The low capability mode might be little more than a minimal 802.11a/g receiver (i.e., 20 MHz, up to 16 QAM with a coding rate of ¾ and 1 SS). The stations also have a higher capability mode in which they operate with some or most of the Wi-Fi 7 capabilities and possibly with Wi-Fi 8) capabilities when Wi-Fi 8 is stabilized.

It is desirable to have a way to obtain the higher performance that the higher capabilities of Wi-Fi 7 (or future Wi-Fi amendments or other wireless standards) can provide, yet preserve or reduce the power consumption during (a) times of idle receive and (b) when being triggered to wake up the high-capability data transfer capability. Thus, embodiments described herein have the station negotiate with the AP for the duration of an extension portion of the preamble in the PPDU that provides sufficient time to transition to the higher capabilities so that the higher performance of the station can be obtained.

FIG. 1 depicts a representative wireless infrastructure and the multiple stations thereby supported, according to embodiments. The infrastructure includes an AP 102 and four stations 1 (116), 2 (118), 3 (120), and 4 (122), coupled to a wireless medium. The AP is coupled to a wired network (N1) 114. N1 114 is coupled to a router 110, which is coupled to the Internet 112. The stations reside in the AP's basic service set (BSS) 124. In addition, BSS COLOR bits help to differentiate between intra-BSS frames and overlapping BSS frames over a set of stations.

Figure 2A:
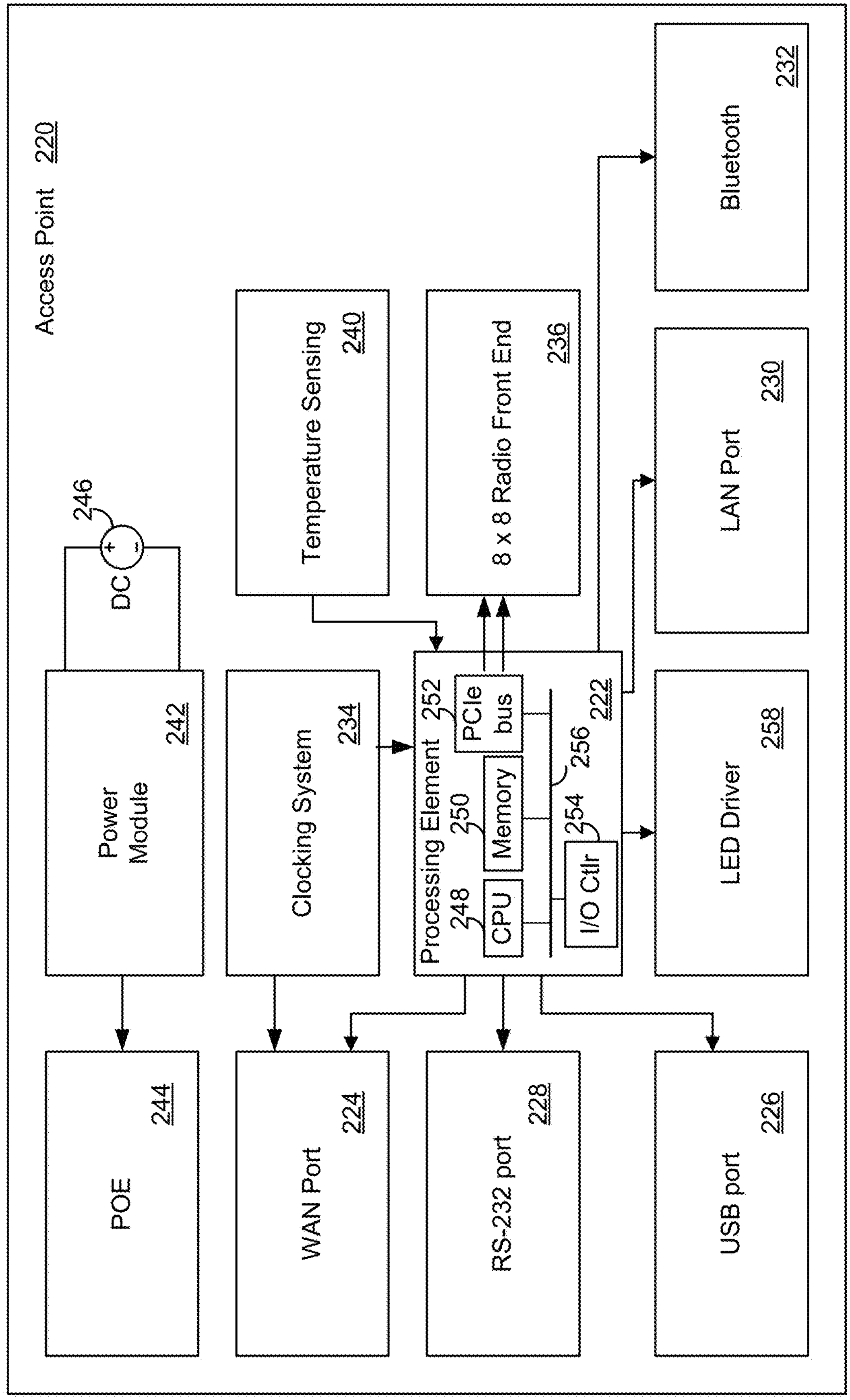
FIG. 2A depicts a representative architecture of an access point (AP), according to embodiments.

FIG. 2A depicts a representative architecture of an AP, according to embodiments. The AP 220 includes a processing element 222 and several ports or connection facilities, such as a wide-area network (WAN) port 224, universal serial bus (USB) port 226, RS-232 port 228, a local area network (LAN) port 230, and Bluetooth 232. Also included are a clocking system 234 and an 8×8 radio front-end 236 with a transmitter and receiver, which are coupled to eight external antennas. Auxiliary modules include a temperature sensing module 240, a power module 242 connected to a DC power source 246, a power over Ethernet (POE) module 244, and LED driver 258. The processing element 222 includes a CPU 248 and memory 250, a peripheral control interconnect express (PCIe) bus controller 252 for connecting to the 8×8 radio front-end 236, and an I/O controller 254, all coupled to each other via bus 256. Memory 250 may include one or more buffers for traffic entering or exiting AP 220.

Figure 2B:
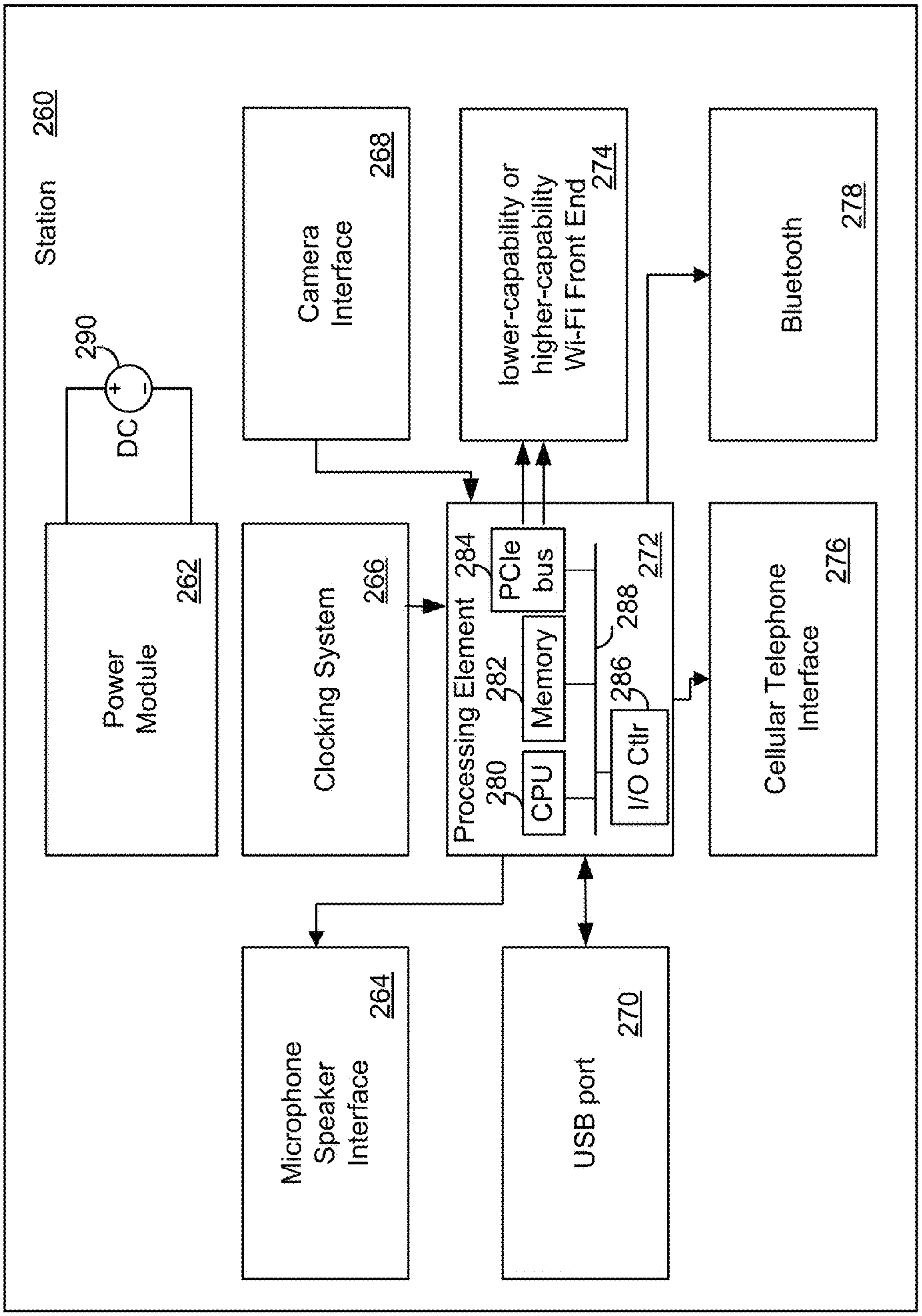
FIG. 2B depicts a representative architecture of a station with multiple capabilities, according to embodiments.

FIG. 2B depicts a representative architecture of a station with multiple capabilities, according to embodiments. Station 260 includes a processing element 272 and several ports or connection facilities, such as a USB port 270 and Bluetooth 278. Also included are a clocking system 266 and a Wi-Fi front-end 274 with transmitters and receivers, which are coupled to one or more external antennas. The Wi-Fi front end 274 has a lower-capability and a higher-capability operation, where capability includes a data throughput parameter, such as the BW, the RUs, the NSS, and the modulation and coding scheme (MCS). Auxiliary modules include a power module 262 connected to a DC power source 290, a microphone and speaker interface 264 coupled to an external microphone and speaker, respectively, a camera interface 268, and a cellular telephone interface 276. The processing element 272 includes a CPU 280 and memory 282, a PCIe bus controller 284 for connecting to the Wi-Fi front-end 274, and an I/O controller 286, all coupled to each other via bus 288. Memory 282 may include one or more buffers for traffic entering or exiting station 260.

Figure 3:
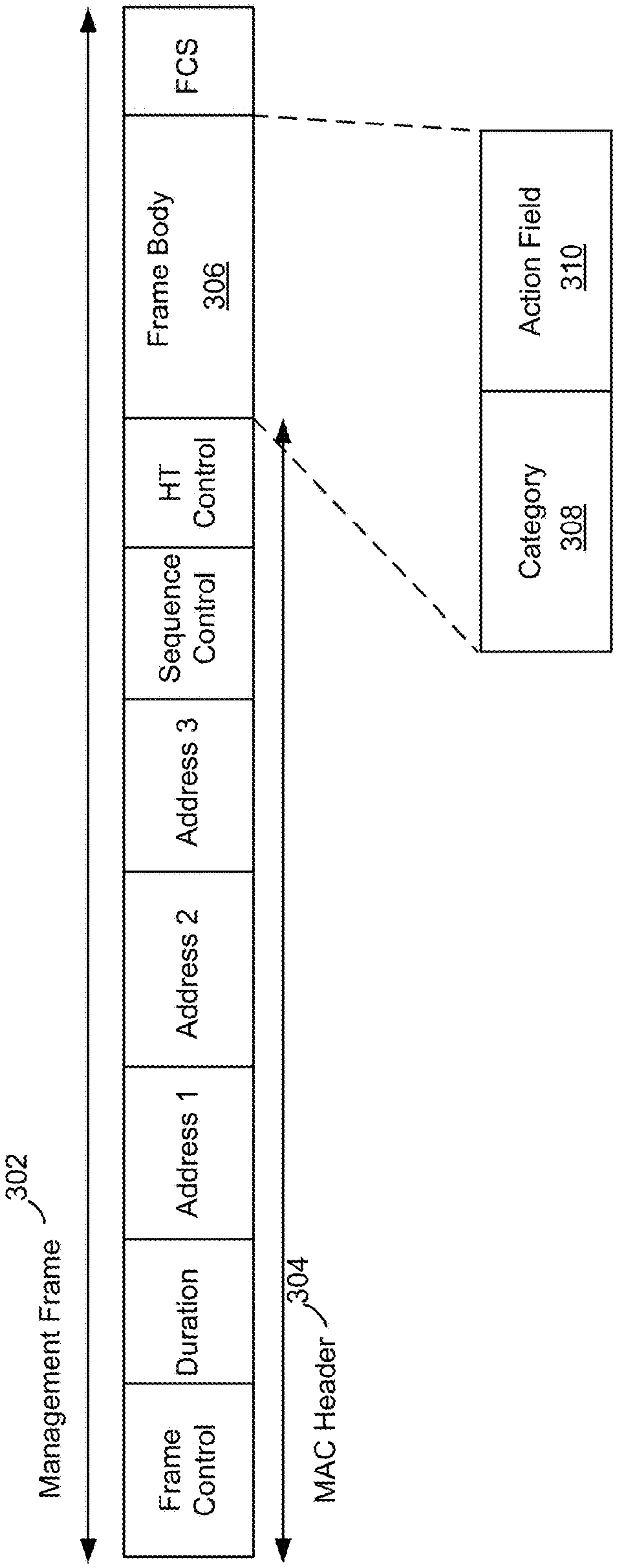
FIG. 3 depicts a management frame, according to embodiments.

FIG. 3 depicts a management frame, according to embodiments. The management frame 302 (e.g., a (Re) Association Request frame) has a medium access control (MAC) header 304, a frame body 306 containing fixed fields and elements, such as the UHR capability element, which reports the station's preamble requirements and a frame check sequence (FCS). The management frame 302 is formatted in a manner similar to an Association or Reassociation frame and can be used in a negotiation between an AP and a station. The frame body 306 can contain either success (accept) or optionally reject-because-the-requested-parameters-were-bad (with an alternative set of tolerable parameters included). A negotiation between the AP and station can be delayed or updated using other management frames such as Preamble Parameter Request and Response frames formatted as UHR Action frames, that is, the same management frame format above but with the frame body 306 set to a category field 308 and an action field 310, where the action field 310 includes a status field (in the Response) and elements such as the UHR capabilities element.

Figure 4:
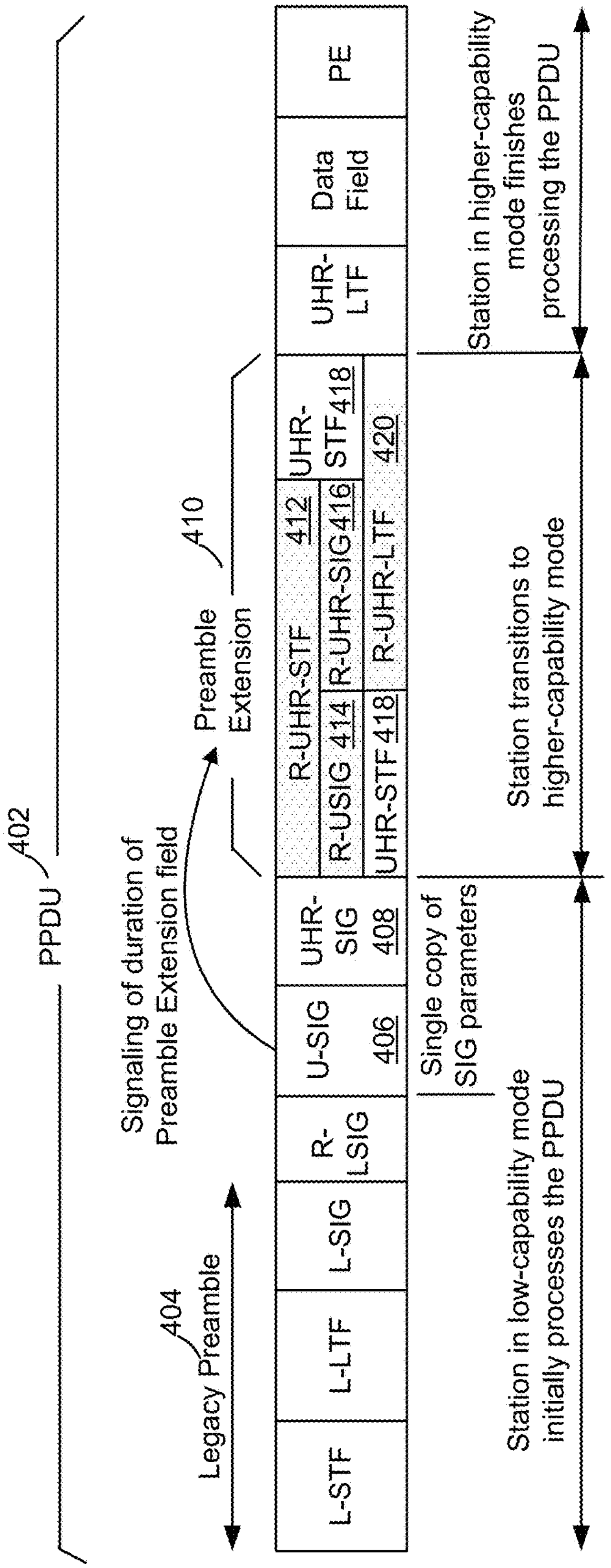
FIG. 4 depicts a PPDU, according to embodiments.

FIG. 4 depicts a PPDU, according to embodiments. The PPDU 402 includes a legacy preamble 404, a repeated LSIG, a universal signal (U-SIG) field 406, a UHR signal field (UHR-SIG) 408, a preamble extension 410, a UHR short training field (UHR-STF) 418, a UHR long training field (UHR-LTF) field, a data field, and a packet extension (PE) field. The data field includes a service field and a (possibly) aggregated PPDU (AMPDU) followed by padding. The legacy preamble 404 includes the legacy STF (L-STF), the legacy LTF (L-LTF), and the legacy SIG field (L-SIG), field. The repeated L-SIG field (R-LSIG) field repeats the L-SIG field.

In one embodiment, the U-SIG field 406 carries the information necessary to interpret the PPDU. The U-SIG field 406 is divided into two parts: U-SIG-1 and U-SIG-2.

The U-SIG-1 field includes a physical (PHY) Version Identifier field, a BW field, an uplink/downlink (UL/DL) field, a BSS COLOR field, and a transmission opportunity (TXOP) field. The PHY Version Identifier field indicates the physical protocol. For example, a zero value specifies the extremely high throughput (EHT) protocol of Wi-Fi 7. The BW specifies the BW from 20 MHz to 320 MHz. The UL/DL field indicates whether the PPDU is addressed to an AP or a non-AP station. The BSS COLOR field identifies the BSS.

The U-SIG-2 part includes other fields, including version-dependent fields and, in an embodiment, a field that specifies the duration of the preamble extension 410 requested by the station and negotiated between the AP and the station. Initially, a station operates in its lower-capability mode to process the legacy preamble, R-LSIG field, and U-SIG field, and, in some modes, the UHR SIG field too. After the initial processing, the station switches to or enables the higher-capability mode and processes the remaining portion of the PPDU according to the higher-capability mode of the station. In some embodiments, the switching or enabling is triggered by a) the reception of a PPDU with a matching BSS COLOR, where the PPDU indicates, in the U-SIG field 406, a greater BW, a higher MCS or greater NSS than the low capability receiver is capable of, or b) the reception of a PPDU with a matching BSS COLOR where the PPDU BW indicated in the U-SIG field 406 is not wider than the supported BW of the STA's low capability receiver and the UHR SIG field lists the ID of a station (STA ID) (i.e., the station can positively determine that the PPDU is intended for the STA), or c) if the low capability receiver must still operate at its full BW capability as indicated by its association capabilities or operating mode indication (OMI/OMN) signaling, then the reception of a PPDU with a matching BSS COLOR where in the PPDU the UHR-SIG field lists the STA ID (i.e. the station can positively determine that the PPDU is intended for the station), The preamble extension 410 being used is commensurate with the time for the physical layer to switch to high-capability mode according to the features of the high-capability mode.

The preamble extension 410, decided upon negotiation between the station and the AP, has four options, at least one of which is standardized. The first option is a repeated UHR-STF (R-UHR-STF) 412 and is the default option.

The second option is a repeated U-SIG (R-USIG) 414 and a repeated UHR-SIG (R-UHR-SIG) 416. In addition to having a duration commensurate with the duration of the PPDU in the higher-capability mode of the station, the R-USIG 414 and R-UHR-SIG 416 enable a longer range if the entire preamble extension is not required to switch to or wakeup the high-capability receiver at the station.

The third option is a UHR-STF field 418 and a repeated UHR LTF (R-UHR-LTF) 420. In addition to having a duration commensurate with the duration of the PPDU in the higher-capability mode of the station, the R-UHR-LTF 420 enables improved channel estimation and interference suppression if the entire preamble extension is not required to switch to or wakeup the high-capability receiver at the station.

A fourth option is a mix of two or more of the previous three options.

Thus, the second option can provide a longer range, and the third option can provide improved channel estimation. And when a high-capability receiver can be switched to or awakened relatively quickly, a negotiated preamble extension (which might last 16/32/64/96/128 microseconds) can provide greater efficiency than a Trigger frame sent before transmitting on the downlink (i.e., since the preamble extension can be much shorter than MU-RTS+CTS described previously, whose duration is TXTIME (PPDU (MURTS trigger frame))+SIFS+TXTIME (PPDU (CTS frame))+SIFS where TXTIME(.) measures the duration of a PPDU including preamble containing the frame(s) listed in the argument, and SIFS is nominally 16 microseconds.

Figure 5A:
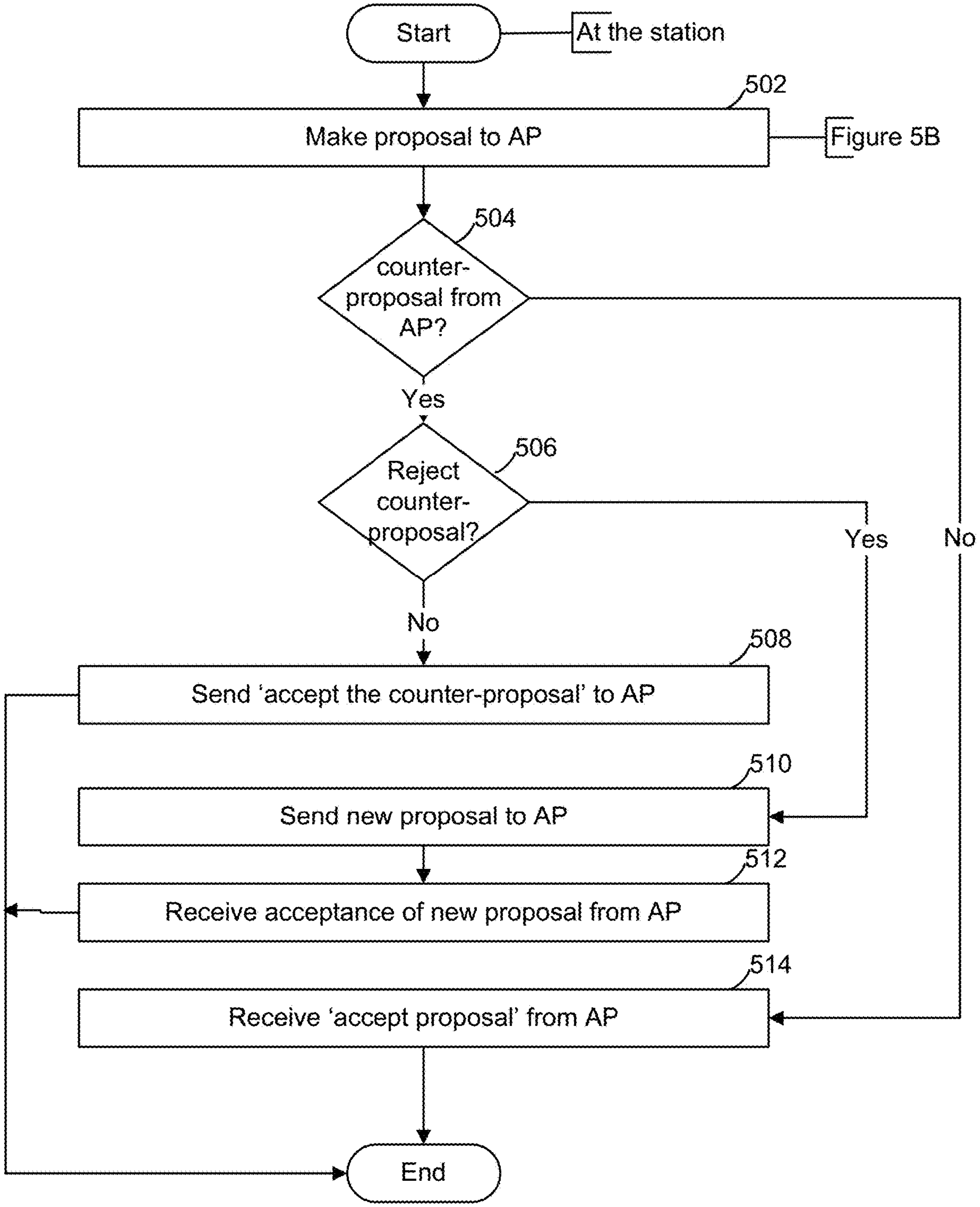
FIG. 5A depicts a flow of operations at a station for negotiating a duration of an extension portion of a preamble, according to embodiments.

FIG. 5A depicts a flow of operations at a station for negotiating a duration of an extension portion of the preamble, according to embodiments. In block 502, the station makes a proposal to the AP, where the proposal includes a set of parameters and a preamble extension duration, according to FIG. 5B. If the station receives a counter-proposal from the AP, as determined in block 504, and the station does not reject the counter-proposal, as determined in block 506, then the station sends an 'accept counter-proposal' message to the AP in block 508. If the station rejects the counter-proposal as determined in block 506, then the station sends a new proposal to the AP in block 510 and receives an acceptance of the new proposal from the AP in block 512. If the station does not receive a counter-proposal from the AP as determined in block 604, then the station receives an 'accept proposal' message from the AP in block 514.

Figure 5B:
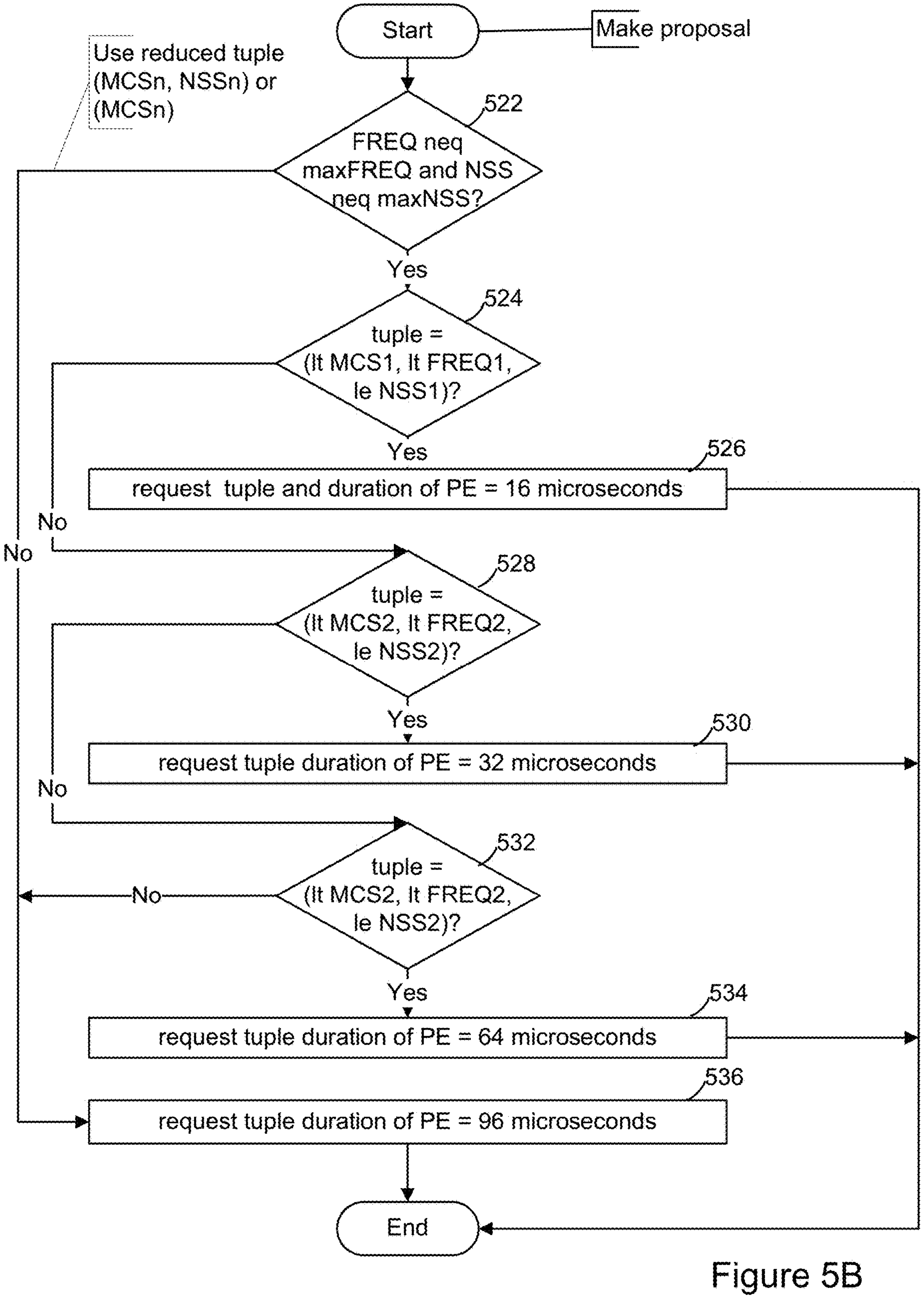
FIG. 5B depicts a flow of operations of the station making a proposal, according to embodiments.

FIG. 5B depicts the flow of operation of a station making a proposal, according to embodiments. Generally, proposals that include a high MCS, a higher data throughput (FREQ) caused by a wider BW (or an RU/MRU positioned further away in frequency from the primary 20 MHz channel), or a higher NSS require longer preamble extensions. In the embodiments, if there are N discrete preamble extension durations (e.g., 16, 32, 64, 96 microseconds), the station can propose N-1 tuples, one for each duration of the preamble extension, where each tuple comprises (MCSn, FREQn, NSSn).

Each item, MCSn, FREQn, or NSSn, in the tuple can cover one or more specific values for the item. For example, in some embodiments, the value of MCS1 covers BPS, QPSK, 16-QAM with ½ or ¾ coding, or 64-QAM with ⅔ or ⅚ coding. The value of MSC2 covers 256 QM with ⅚ coding. The value of MSC3 covers 1024-QAM with ¾ or ⅚ coding, and the value of MCS4 covers 4096-QAM with ¾ or ⅚ coding.

The parameter FREQn, in some embodiments, is intended to account for a change in data throughput caused by a frequency change, RU change, or BW change at the station: e.g., the PPDU BW, the narrowest PPDU BW that incorporates the RU/MRU allocated to the station, or a measure of the frequency between the primary 20 MHz channel and the center or farther edge of the allocated RU/MRU. Thus, values of FREQ1-4 can cover combinations of changes in PPDU BWs of 20, 40, 80, 160, and 320 MHz, changes with RUs of 26, 52, 106, or with RUs of 242, 484, 996, 2*996, or 4*996 or differences in frequency between 20 MHz and the center/farther edge of RU/MRU.

Values of NSS1, in some embodiments, cover 1 SS, NSS2, 2 SS, NSS3, 4 SS, and NSS4, the maximum number (e.g., 8) of SS.

In block 522, if the station does not operate with the maximum value of FREQn and maximum NSSn, flow proceeds to block 524. If the station operates with a tuple value (less than (It) MCS1, It FREQ1, less than or equal (le) NSS1) as determined in block 604, then in block 526, the station proposes operation with the tuple and a preamble extension duration of 16 microseconds. In block 528, if the station operates with a tuple equal to (It MCS2, It FREQ2, le NSS2), then in block 530, the station proposes operation with the tuple and a preamble extension duration of 32 microseconds. In block 532, if the station operates with a tuple equal to (It MCS3, It FREQ3, le NSS3), then in block 534, the station proposes the operation with the tuple and a preamble extension of 64 microseconds. For any other tuple values, then in block 536, the station proposes operation with the tuple and a preamble extension duration of 96 microseconds.

When the station operates at its maximum BW as indicated by its association capabilities or OMI/OMN signaling, the tuple is reduced to values of MCSn and NSSn, as FREQn is fixed at the maximum. When the station operates with the maximum NSS and maximum BW, the tuple is reduced to values of MCSn, one for each SS.

Figure 6A:
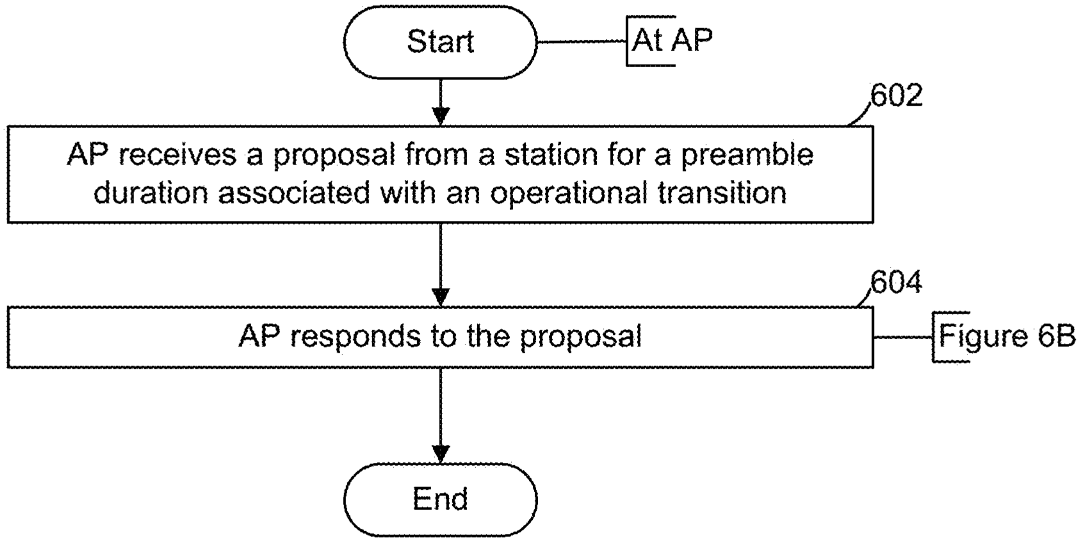
FIG. 6A depicts a flow of operations for negotiating a duration of an extension portion of a preamble, according to embodiments.

FIG. 6A depicts a flow of operations for negotiating a duration of an extension portion of the preamble, according to embodiments. In block 602, the AP receives a proposal from a station for a preamble extension duration associated with an operational transition, where the operation transition is a change in MCS, a change in FREQn (which includes a change in BW and/or RU), or a change in NSS. In block 604, the AP responds to the proposal according to the flow in FIG. 6B. In one embodiment, the proposal is made by sending a management frame, such as the management frame 302, and the AP responds with a management frame.

Figure 6B:
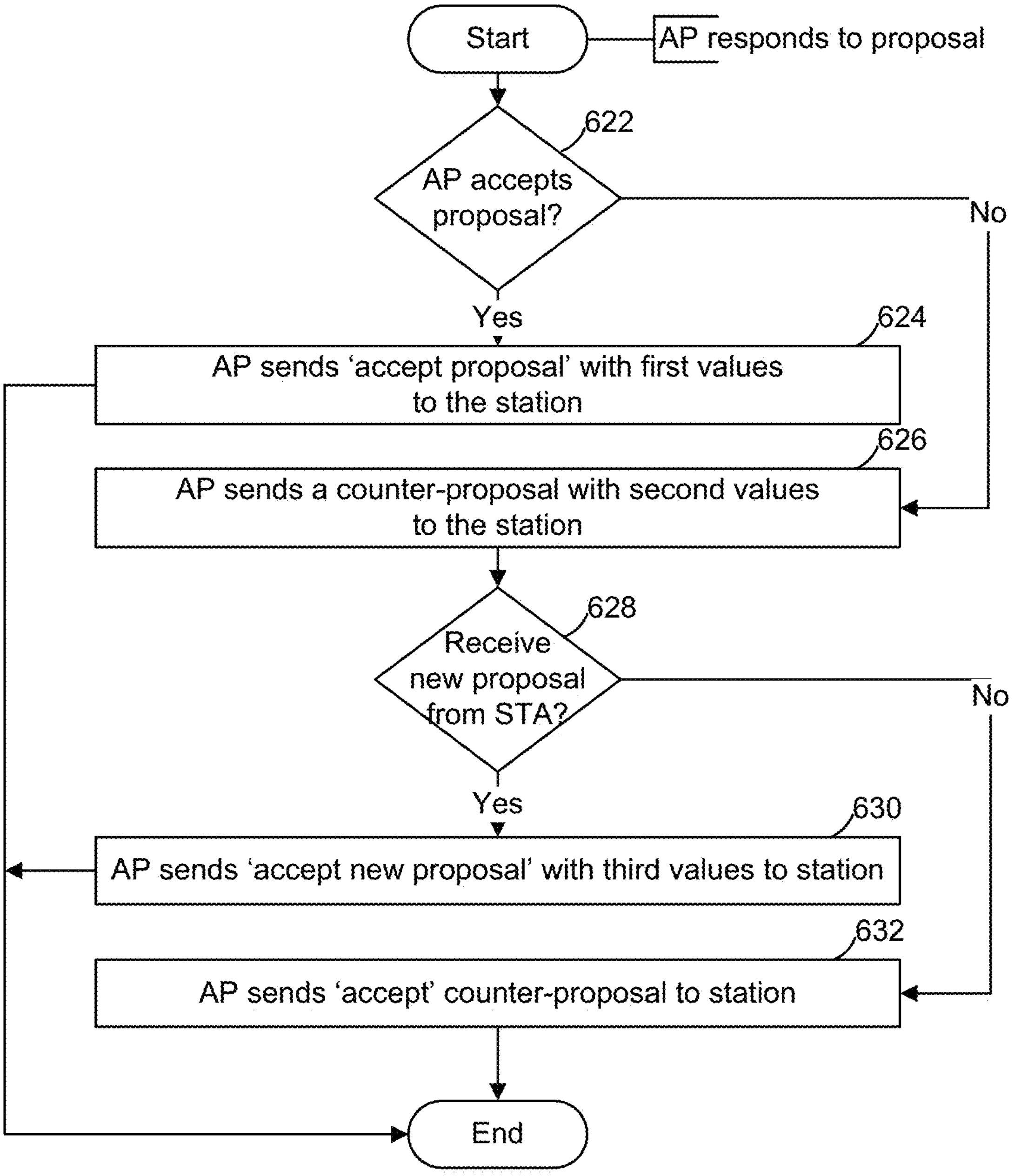
FIG. 6B depicts a flow of operations for an AP response to a station proposal, according to embodiments.

FIG. 6B depicts a flow of operations for an AP response to a station proposal, according to embodiments. If the AP responds to the proposal, which includes a set of parameters with first values, by accepting the proposal, as determined in block 622, the AP sends an 'accept proposal' message in block 624 to the station making the proposal, thus fixing or determining the values of the set of parameters. If the AP responds by rejecting the proposal because it may not be able to comply with the proposal or may not want the inefficiency of complying with the proposal, then in block 626, the AP sends a counter-proposal to the station, where the counter-proposal includes the same set of parameter but with second values, the second values differing from the first values with respect FREQn, NSSn, or MCSn or a combination thereof and being more suited to the capabilities of the AP. In one embodiment, the AP sends the counter-proposal as a management frame.

Still referring to FIG. 6B, if the AP receives a new proposal FREQn, NSSn, or MCSn) with third values for the parameters from the station, as determined in block 628, then, in block 630, the AP sends an 'accept new proposal' to the station, thus fixing the values. If the AP does not receive a new proposal, as determined in block 628, then in block 632, the AP sends an 'accept counter-proposal' to the station, thus fixing the values.

Thus, in negotiating for the duration of a preamble extension in the preamble of a PPDU, the preamble duration is tailored to a station that can operate with a greater NSS, different FREQ, or more efficient MCSs. In addition, when the AP transmits to a mix of stations, the negotiation ensures that the preamble extension suits each client regarding the parameters MCS, FREQ, and NSS. The extended preamble also provides for power savings, long-range operation, and greater efficiency than a Trigger frame sent before transmitting on the downlink.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer-readable medium(s) having computer readable program code embodied thereon.

Program code embodied on a computer-readable medium, possibly non-transitory, may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a (possibly non-transitory) computer-readable medium that can direct a computer, other programmable data processing apparatus, or other device to function in a particular manner, such that the instructions stored in the computer-readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer-implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

I claim:

1. A method of negotiating a duration of an extension portion of a preamble, the method comprising:
- receiving a proposal from a station, wherein the proposal includes a set of parameters with values equal to first values to be used by the station when the station makes an operational transition; and
- responding to the proposal, wherein responding fixes the values of the set of parameters and the duration of the extension portion of the preamble.

2. The method of claim 1, wherein responding to the proposal includes accepting the proposal.

3. The method of claim 1, wherein responding to the proposal includes:
- rejecting the proposal;
- sending a counter-proposal to the station, wherein the counter-proposal includes the set of parameters with second values; and
- receiving an acceptance of the counter-proposal from the station.

4. The method of claim 1, wherein responding to the proposal includes:
- rejecting the proposal;
- sending a counter-proposal to the station, wherein the counter-proposal includes the set of parameters with second values;
- receiving a new proposal from the station, wherein the new proposal includes the set of parameters with third values; and
- sending an acceptance of the new proposal to the station.

5. The method of claim 1, wherein the operational transition causes the station to operate with a higher capability.

6. The method of claim 5, wherein the higher capability is the station operating with a higher value of a modulation and coding scheme.

7. The method of claim 5, wherein the higher capability is the station operating with a higher number of spatial streams.

8. The method of claim 5, wherein the higher capability is the station operating with a higher data throughput value.

9. An access point comprising:
- a processor; and
- a memory coupled to the processor and loaded with a program executable by the processor to:
- receive a proposal from a station, wherein the proposal includes a set of parameters with values equal to first values to be used by the station when the station makes an operational transition; and
- respond to the proposal, wherein being executable to respond to the proposal fixes the values of the set of parameters and a duration of an extension portion of a preamble.

10. The access point of claim 9, wherein the program being executable to respond to the proposal includes the program being executable to accept the proposal.

11. The access point of claim 9, wherein the program being executable to respond to the proposal includes:
- the program being executable to reject the proposal;
- the program being executable to send a counter-proposal to the station, wherein the counter-proposal includes the set of parameters with second values; and
- the program being executable to receive an acceptance from the station of the counter-proposal.

12. The access point of claim 9, wherein the program being executable to respond the proposal includes:
- the program being executable to reject the proposal;
- the program being executable to send a counter-proposal to the station, wherein the counter-proposal includes the set of parameters with second values;
- the program being executable to receive a new proposal from the station, wherein the new proposal includes the set of parameters with third values; and
- the program being executable to send an acceptance of the new proposal to the station.

13. The access point of claim 9, wherein the operational transition causes the station to operate with a higher capability.

14. The access point of claim 13, wherein the higher capability is the station operating with a higher value of modulation and coding scheme.

15. The access point of claim 13, wherein the higher capability is the station operating with a higher number of spatial streams.

16. The access point of claim 13, wherein the higher capability is the station operating with a higher data throughput value.

17. A non-transitory computer-readable medium encoding instructions, which, when executed by a processor of an access point (AP) coupled to a wireless medium, cause the AP to:
- receive a proposal from a station, wherein the proposal includes a set of parameters with values equal to first values to be used by the station when the station makes an operational transition; and
- respond to the proposal, wherein causing the AP to respond to the proposal fixes the values of the set of parameters and a duration of an extension portion of a preamble.

18. The non-transitory computer-readable medium of claim 17, wherein the instructions to cause the AP to respond to the proposal include instructions to cause the AP to accept the proposal.

19. The non-transitory computer-readable medium of claim 17, wherein the instructions to cause the AP to respond to the proposal include instructions to:

cause the AP to reject the proposal;

cause the AP to send a counter-proposal to the station, wherein the counter-proposal includes the set of parameters with second values; and cause the AP to receive an acceptance from the station of the counter-proposal.

20. The non-transitory computer-readable medium of claim 17, wherein the instructions to cause the AP to respond to the proposal include instructions to:

cause the AP to reject the proposal;

cause the AP to send a counter-proposal to the station, wherein the counter-proposal includes the set of parameters with second values;

cause the AP to receive a new proposal from the station, wherein the new proposal includes the set of parameters with third values; and causeg the AP to send an acceptance of the new proposal to the station.

* * * * *